W. O. LONG.
DRAW BAR FOR HARROWS.
APPLICATION FILED DEC. 14, 1918.
1,314,680.
Patented Sept. 2, 1919.
2 SHEETS—SHEET 2.
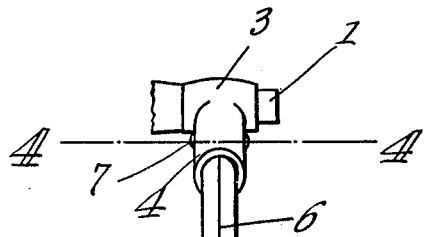
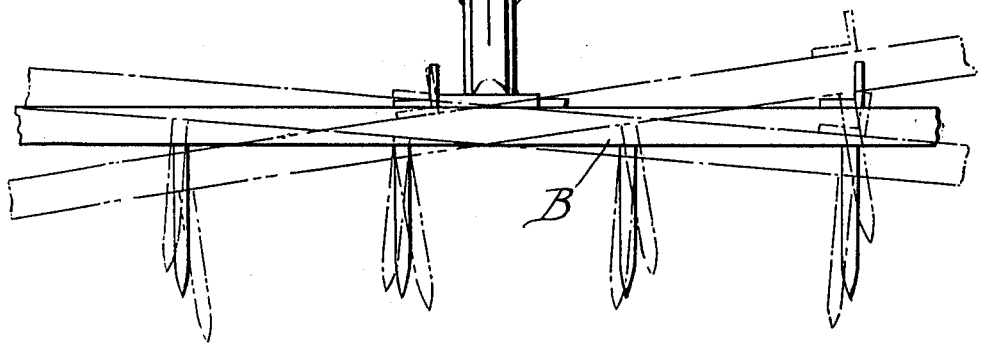
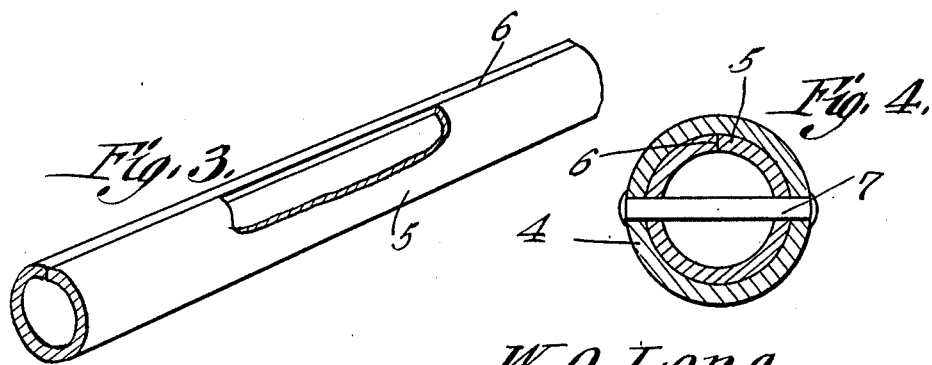
W. O. Long
Inventor

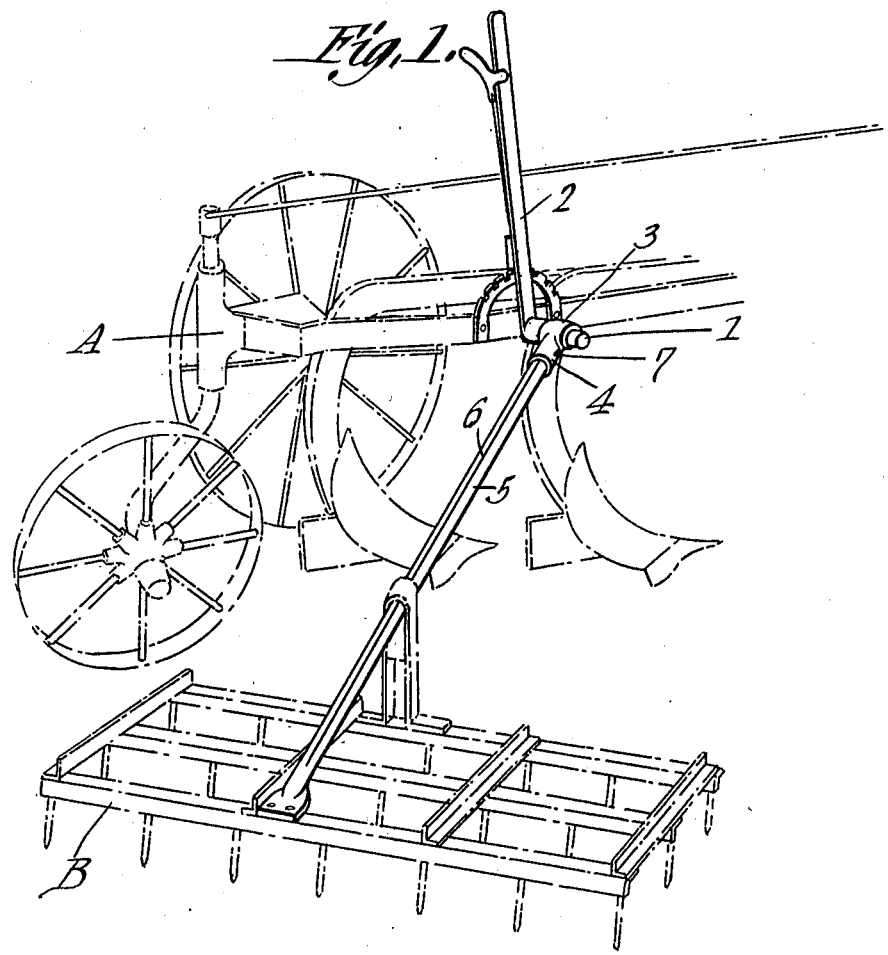

UNITED STATES PATENT OFFICE.

WILLARD O. LONG, OF MANSFIELD, OHIO.

DRAW-BAR FOR HARROWS.

1,314,680.  Specification of Letters Patent.  Patented Sept. 2, 1919.

Application filed December 14, 1918. Serial No. 266,838.

*To all whom it may concern:*

Be it known that I, WILLARD O. LONG, a citizen of the United States, residing at Mansfield, in the county of Richland and State of Ohio, have invented a new and useful Draw-Bar for Harrows, of which the following is a specification.

This invention relates to draw bars for harrow attachments of plows.

One of the objects of the invention is to provide a draw bar made of spring metal and which will not yield upwardly or downwardly while in use but is at all times free to yield when subjected to torsional strains, thus to allow the harrow structure, which is connected to and drawn by the bar, to tilt laterally when passing over an uneven surface.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a perspective view of a draw bar such as constitutes the present invention, mounted between the plow structure and a harrow.

Fig. 2 is an enlarged rear elevation of a portion of a harrow structure and showing the draw bar connected thereto, several positions to which the harrow structure may be tilted being indicated by dotted lines.

Fig. 3 is a perspective view of a portion of the draw bar, part thereof being broken away.

Fig. 4 is an enlarged section on line 4—4, Fig. 2.

Referring to the figures by characters of reference, A designates a plow structure and B designates a harrow structure, both of which can be of any construction desired: On the plow structure is secured a shaft 1 adapted to be rotated in any suitable manner, as by means of a lever 2 and to this shaft is fastened a sleeve 3 having a tubular extension 4. The draw bar 5 is formed of a spring metal tube, such as steel, split longitudinally, as shown at 6, and one end of this bar is fastened to the harrow section B while the other end extends into and is secured within the extension 4, so as to be held against rotation, any suitable means, such as a pin 7, being provided for this purpose.

When the harrow section is in use the teeth thereof are held pressed into the soil by the draw bar 5. If the surface of the soil be irregular, however, the said bar will twist under the torsional strains to which it is thereby subjected, thus allowing the harrow section to adapt itself to such irregularities, the resiliency of the bar being such that the harrow section will always be returned to normal position after passing over an uneven surface. As the arm is tubular and of considerable strength, it will not yield upwardly or downwardly but will only allow the lateral tilting of the harrow structure as described.

What is claimed is:—

1. The combination with a harrow structure, of means for connecting said structure to a plow, comprising a split tubular bar of spring material yieldable resiliently to torsional strains.

2. The combination with a harrow structure, of a tubular bar slit longitudinally and formed of resilient material, one end of the bar being attached to the harrow structure, means for connecting the other end of the bar to a support, said bar being yieldable solely to torsional strains.

3. The combination with a plow structure including a shaft, and means for rotating and holding the shaft, of a harrow structure, and a tubular draw bar connected to the shaft and to the harrow structure, said bar being formed of spring metal and split longitudinally to yield under torsional strains and allow lateral tilting of the harrow structure.

In testimony that I claim the foregoing as my own, I have hereto affixed my signature in the presence of two witnesses.

WILLARD O. LONG.

Witnesses:
E. H. BLANKART,
S. A. STRICKLAND.

Copies of this patent may be obtained for five cents each, by addressing the "Commissioner of Patents, Washington, D. C."